(12) United States Patent
Gupta et al.

(10) Patent No.: US 11,429,419 B2
(45) Date of Patent: Aug. 30, 2022

(54) SECURE ACCESS OF VIRTUAL MACHINE MEMORY SUITABLE FOR AI ASSISTED AUTOMOTIVE APPLICATIONS

(71) Applicant: NVIDIA Corporation, San Jose, CA (US)

(72) Inventors: Ajay Kumar Gupta, Milpitas, CA (US); Venkat Tammineedi, San Jose, CA (US); David Lim, Cupertino, CA (US); Ashutosh Jha, Sunnyvale, CA (US)

(73) Assignee: NVIDIA Corporation, San Jose, CA (US)

( * ) Notice: Subject to any disclaimer, the term of this patent is extended or adjusted under 35 U.S.C. 154(b) by 60 days.

(21) Appl. No.: 16/530,323

(22) Filed: Aug. 2, 2019

(65) Prior Publication Data
US 2020/0042341 A1 Feb. 6, 2020

Related U.S. Application Data

(60) Provisional application No. 62/714,634, filed on Aug. 3, 2018.

(51) Int. Cl.
*G06F 9/455* (2018.01)
*G06F 3/06* (2006.01)
*G05D 1/00* (2006.01)

(52) U.S. Cl.
CPC ........ *G06F 9/45558* (2013.01); *G05D 1/0088* (2013.01); *G06F 3/0622* (2013.01);
(Continued)

(58) Field of Classification Search
None
See application file for complete search history.

(56) References Cited

U.S. PATENT DOCUMENTS 8,627,112 B2 * 1/2014 Chaturvedi ............. G06F 21/53
713/193
9,058,183 B2 * 6/2015 Woller ................ G06F 9/45545
(Continued)

OTHER PUBLICATIONS

Perez et al. "Virtualization and Hardware-Based Security", 2008 IEEE, pp. 24-31.*
(Continued)

*Primary Examiner* — Van H Nguyen
(74) *Attorney, Agent, or Firm* — Taylor English Duma LLP

(57) ABSTRACT

In various examples, access to VM memory by virtualization software is secured using a trusted firmware of a host controller to validate one or more of a command to read a VM's memory and/or the data read from VM memory in order to protect against improper access to data in VM memory. If validation fails, the firmware may refrain from reading the data and/or from providing the virtualization software with access to the data. The data may include a request command from a VM regarding establishing or modifying a connection using the host controller to another entity, such as another device within or outside of the virtualization environment. The virtualization software may use the request command to facilitate the connection. The host controller may provide an eXtensible Host Controller Interface (xHCI) or a different type of interface for the connection.

20 Claims, 6 Drawing Sheets

(52) U.S. Cl.
CPC .......... *G06F 3/0659* (2013.01); *G06F 3/0662* (2013.01); *G06F 3/067* (2013.01); *G06F 2009/45595* (2013.01)

(56) References Cited

U.S. PATENT DOCUMENTS

| | | | |
|---|---|---|---|
| 9,262,197 B2* | 2/2016 | Chawla | G06F 12/0875 |
| 9,753,867 B2* | 9/2017 | Hashimoto | G06F 21/79 |
| 9,753,868 B2* | 9/2017 | Yamada | G06F 21/64 |
| 10,503,922 B2* | 12/2019 | Iyer | G06F 21/6218 |
| 10,713,074 B2* | 7/2020 | Li | G06F 12/109 |
| 2012/0254993 A1 | 10/2012 | Sallam | |
| 2017/0206104 A1 | 7/2017 | Sliwa et al. | |
| 2017/0329625 A1* | 11/2017 | Li | G06F 12/1009 |

OTHER PUBLICATIONS

Champagne et al. "Scalable Architectural Support for Trusted Software", 2009 IEEE, 12 pages.*
EXtensible Host Controller Interface for Universal Serial Bus (xHCI), Requirements Specification, May 2019, Revision 1.2, Intel Corporation, pp. 56-65. https://www.intel.com/content/dam/www/public/us/en/documents/technical-specifications/extensible-host-controler-interface-usb-xhci.pdf.
International Search Report and Written Opinion dated Nov. 27, 2019 in International Patent Application No. PCT/US2019/044858. 13 pages.
International Preliminary Report on Patentability received for PCT Application No. PCT/US2019/044858, dated Feb. 18, 2021, 9 pages.

* cited by examiner

SECURE ACCESS OF VIRTUAL MACHINE MEMORY SUITABLE FOR AI ASSISTED AUTOMOTIVE APPLICATIONS

CLAIM OF PRIORITY

This application claims priority to and the benefit of U.S. patent application Ser. No. 62/714,634 filed on Aug. 3, 2018, which is incorporated herein by reference in its entirety.

BACKGROUND

Virtualization allows multiple Virtual Machine (VMs)—often used to host Operating System Instances (OSI)—to run concurrently within a single host system. A default interface (without virtualization of the interface) presented by a host controller to the host system may include a Physical Function (PF), or host controller interface. Examples of host controller interfaces include those used for Universal Serial Bus (USB), FireWire, Bluetooth, Ethernet, Peripheral Component Interconnect (PCI), or other types of communications. For example, an eXtensible Host Controller Interface (xHCI) may be used to support USB communications. Virtualization of the host controller interface enables multiple Virtual Functions (VF) to share a PF. To minimize hardware requirements, the physical interface presented by a VF typically includes only a subset of that presented by the corresponding PF and relies on virtualization software to emulate portions of the VF interface to fill in the gaps.

Conventionally, the virtualization software may be used to facilitate a connection between a VM and another entity using a VF, such as another entity within the host system (e.g., another VM), or an entity external to the host system (e.g., a hardware device). For example, the virtualization software may assist the VM in establishing a connection using the VF, or modifying an existing connection using the VF. To facilitate the connection, the virtualization software may read data from the memory of the VM which indicates information requested by the VM, such as connection properties. In the example of xHCI, the data may be Command Transfer Request Block (TRB) data used to request device properties of a newly connected device. This poses a security risk in that if the virtualization software becomes compromised, it may be possible for a malicious actor to read the memory allocated to any VM through the host controller interface. For example, a component of the virtualization software responsible for mapping VM memory may manipulate the mapping to access unauthorized locations in memory.

SUMMARY

The present disclosure relates, in part, to securing access to VM memory by virtualization software to facilitate a connection between a VM and another entity using a VF. In contrast to conventional approaches, a trusted firmware of a host controller may validate one or more of a command to read a VM's memory and/or the data read from VM memory in order to protect against improper access to data in VM memory. If validation fails, the firmware may refrain from reading the data and/or from providing the virtualization software with access to the data. Thus, if virtualization software becomes compromised, a malicious actor may be prevented from arbitrarily accessing VM memory.

To read the data, one or more virtual machine managers (VMMs) of the virtualization software may send a read command to trusted firmware of the host controller that indicates memory locations to read in order to access the data. The host controller firmware may validate the read command and/or the data read from VM memory. For example, the host controller firmware may confirm that the read command matches a doorbell event for a corresponding VM's command ring, confirm that it sent a doorbell event to the VMM prior to receiving the read command, and/or check that a memory size specified by command is valid. As further examples, the host controller firmware may read the data and confirm the data is of a proper format and/or includes proper information or parameters. The host controller may refrain from providing the VMM to access the data if the command and/or the data is not validated (e.g., determined to be invalid).

BRIEF DESCRIPTION OF THE DRAWINGS

The present systems and methods for secure access of virtual machine memory is described in detail below with reference to the attached drawing figures, wherein.

DETAILED DESCRIPTION

Figure 1:
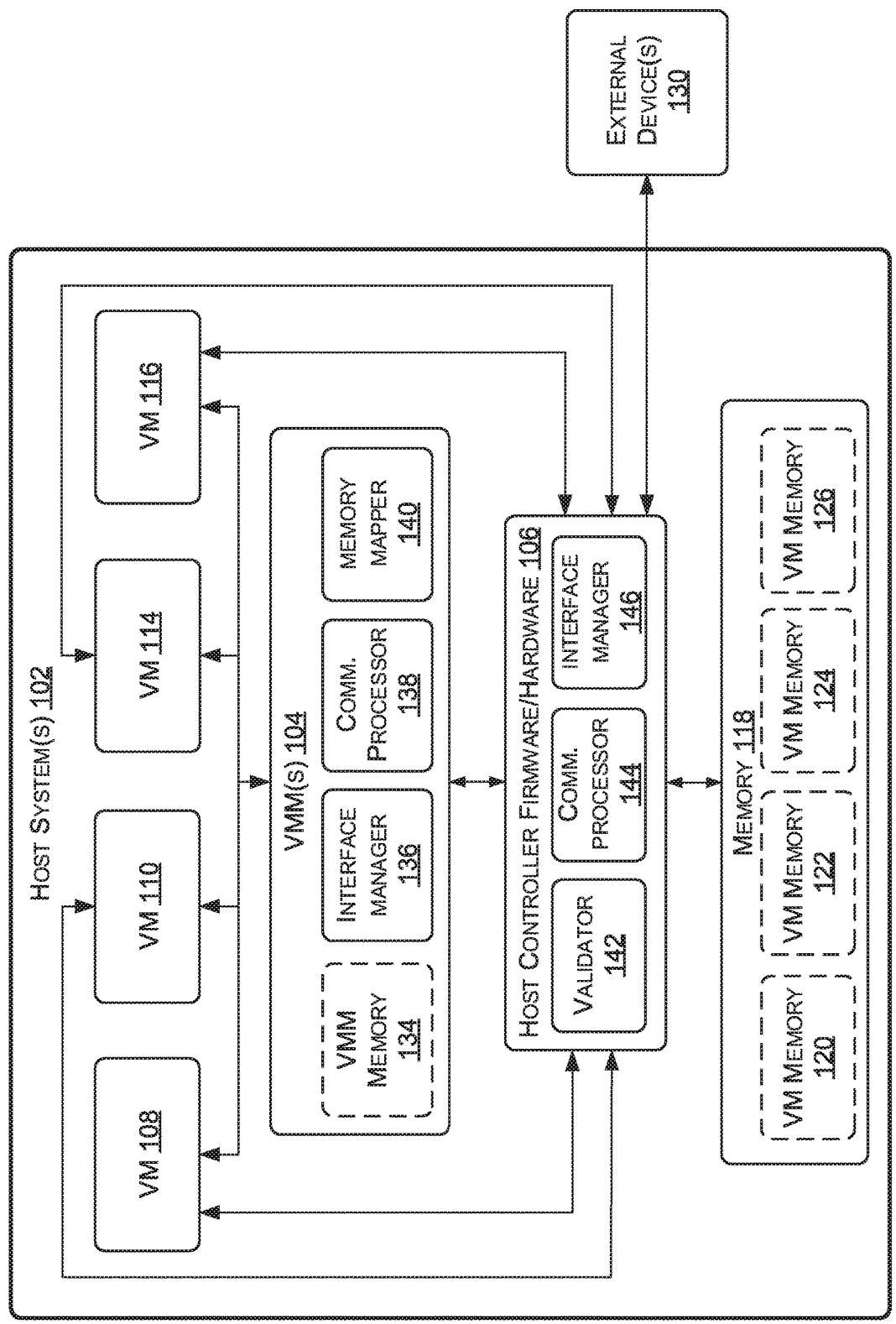
FIG. 1 is a diagram of an example of an operational environment for validating access by virtualization software to data in memory, in accordance with some embodiments of the present disclosure.

Systems and methods are disclosed related to using trusted firmware of a host controller to validate one or more of a command to read a VM's memory (e.g., system memory dedicated or allocated to a VM) and/or the data read from VM memory in order to protect against improper access to data in system memory. As a result, if virtualization software becomes compromised, a malicious actor may be prevented from arbitrarily accessing VM memory.

In various embodiments, one or more virtual machine managers (VMM(s)) of virtualization software and a VF may be used to facilitate a connection between a VM and another entity (e.g., an external VM, an external device), such as another entity within the host system (e.g., another VM), or an entity external to the host system. The VMM(s) may or may not include a hypervisor of a host system. To facilitate the connection, the VM may receive a notification from the VMM regarding the entity. For example, a user may connect a USB device to an xHCI controller, and the xHCI controller may notify the VMM of the new device, which in turn notifies the appropriate VM. In response to the notification, the VM may provide a command intended for the VMM that it stores as data in the memory of the underlying system or device designated for the VM. To read the data, the VMM may send a read command to the trusted firmware of the host controller that indicates memory locations to read in order to access the data.

In some aspects of the present disclosure, the host controller firmware may validate the read command. For example, the host controller firmware may confirm that the read command matches a doorbell event for a corresponding VM's command ring. As another example, the host controller firmware may confirm that it sent a doorbell event to the VMM (e.g., to indicate to the VMM to help process commands in the VM's command ring) prior to receiving the command. As another example, the host controller firmware may check that a memory size specified by a command is valid (e.g., a TRB may be 16 bytes and a larger or smaller size may indicate an invalid command). If the command is not validated, the host controller firmware may refrain from reading the memory locations and/or from providing the VMM(s) with access to data read from the memory locations.

In further aspects of the present disclosure, in addition to or instead of the host controller firmware validating the command, the host controller firmware may validate data read from the memory locations. For example, the host controller firmware may read the data and confirm the data is of a proper format and/or includes proper information or parameters. This may include checking that a request type field has a valid value, one or more reserved fields has an expected value, a Slot Identifier (ID) is within a predetermined range, and/or the data is in a predefined format. In the example of an xHCI interface, this may include checking that a TRB type field is within a valid range, one or more reserved fields are equal to zero, the Slot ID is within a predetermined range, and/or the data is in a TRB format. If the data that is read is not validated, the host controller firmware may refrain from providing the VMM(s) with access to data read from the memory locations.

In any example, if the command and/or the data is not validated (e.g., determined to be invalid), the firmware may provide a command completion event (e.g., CCode=0) to the VMM(s) indicating a failure of the command. If the command and/or the data is validated, the host controller firmware may provide the VMM(s) with access to the data, such as by copying the data to VMM memory. Further, the host controller firmware may provide a command completion event (e.g., CCode=1) to the VMM(s) indicating a success of the command. This may indicate to the VMM that it may read the data from the VMM memory.

Now referring to FIG. 1, FIG. 1 is a diagram of an example of an operational environment 100 for validating access by virtualization software to data in memory, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The operational environment 100 may include among other things, a host system(s) 102, and an external device(s) 130. The operational environment 100 may, for example, be implemented using one or more computing devices 600 of FIG. 6. The host system 102 may include a VMM 104, a host controller firmware/hardware 106 (also referred as "host controller 106" or "host controller firmware 106"), a VM 108, a VM 110, a VM 114, a VM 116, and a memory 118. The VMM 104 may include a VMM memory 134, an interface manager 136, a communications processor 138, and a memory mapper 140. The host controller firmware 106 may include a validator 142, a communications processor 144, and an interface manager 146. The memory 118 may include a VM memory 120, a VM memory 122, a VM memory 124, and a VM memory 126.

The host system(s) 102 may be configured to host one or more virtualized environments. The virtualized environments may be managed by virtualization software, an example of which may include the one or more VMMs 104. The VMM(s) 104 may or may not include a hypervisor of the host system 102. The hypervisor may create and run any number of VMs, such as the VMs 108, 110, 114, or 116 (e.g., guest VMs), and/or virtualization services (e.g., the VMM 104) of the virtual environment(s).

The VMM 104 may, amongst other potential functionalities, be configured to facilitate (e.g., using an xHCI compliant server) a connection between any of the VMs, such as the VM 108, and another entity via the host controller 106 using a VF. Examples of the other entity include an entity within the host system 102 (e.g., the VM 116), or an entity external to the host system (e.g., the external device 130). The interface manager 136 of the VMM 104 may be configured to manage communications to and from the VMM 104. The communications processor 138 of the VMM 104 may be configured to generate communications, such as read commands to read VM memory, and/or to process received communications, such as doorbell events or request commands in the VMM memory 134 from VMs. The memory mapper 140 of the VMM 104 may be configured to map data corresponding to a VF or VM to a corresponding memory address in the memory 118 (e.g., the VM memory 120 for the VM 108) for a read command to read data from the VM's memory.

The host controller 106, amongst other potential functionalities, may be configured to provide an interface for the connections between VMs and other entities, as well as validate the reads commands from the VMM 104 and/or data read from VM memory. For example, the interface manager 146 of the host controller 106 may be configured to manage communications to and from the host controller 106. The communications processor 144 of the host controller 106 may be configured to process received communications, such as doorbell events from VMs, the read commands from the VMM 104, and/or data read from VM memory based on the read commands, such as request commands from VMs. The communications processor 144 of the host controller 106 may also be configured to generate communications, such as doorbell events for the VMM 104. At least some of the processing performed by the communications processor 144 may use the validator 142 of the host controller 106 to validate a read command and/or the data read from VM memory of a VM, as described herein. Once validated, the interface manager 146 of the host controller 106 may provide the data to the VMM memory 134 for use in establishing and/or modifying a connection between the VM and another entity. The interface manager 146 may then communicate directly with the VM and the other entity to host the connection without requiring use of the VMM 104 (e.g., for data transfer related work).

The host system 102 may be implemented on one or more Integrated Circuits (ICs) that may include, but is not limited to, one or more System-on-Chip (SoCs) and/or Graphics Processing Units (GPUs). The host system 102 may generally be used in any application in which a VM communicates with another entity using a host controller interface. In some examples, the host system 102 may form at least a portion of an embedded system, such as an Electronic Control Unit (ECU). The host system 102 may be incorporated into, for example, non-autonomous vehicles, semi-autonomous vehicles (e.g., in one or more advanced driver assistance systems (ADAS)), robots, warehouse vehicles, off-road vehicles, flying vessels, boats, and/or other vehicle types. The host system 102 may use the VM 108, 110, 114, or 116, for example, to determine and/or convey (e.g., using the host controller 106) controls for accelerators, braking, and/or functions of one or more devices. This may be used for ADAS, robotics (e.g., path planning for a robot), aerial systems (e.g., path planning for a drone or other aerial vehicle), boating systems (e.g., path planning for a boat or other water vessel), and/or other technologies.

Each of the VMs 108, 110, 114, and 116 of the host system 102 may be a virtual computing device. Each of the VMs 108, 110, 114, and 116 may have separate capabilities and operational address spaces in the memory 118. For example, the VMs 108, 110, 114, and 116 may have respective address spaces that correspond to the VM memory 120, the VM memory 122, the VM memory 124, and the VM memory 126 respectively. The memory 118 may refer to one or more physical memory devices and the hypervisor and/or the VMM 104 may be responsible for supporting the ability of the VMs 108, 110, 114, and 116 to share the physical device(s) while enforcing the distinct address spaces. In some examples, each VM is on a different partition supported by the hypervisor and/or the VMM 104.

One or more of the VMs 108, 110, 114, or 116 may receive and provide communications with peripheral devices (e.g., the external device 130) and components via the host controller 106. Examples of the external device 130 include any device capable of communicating with a VM over a host controller interface, such as an ECU, a USB drive, a camera, a smartphone, a VM, a laptop, a personal computer, a network device, a peripheral device, a client device, etc. Each VM may comprise an OSI, such as a guest OS, examples of which include deployments of Linux, Android, GENIVI, QNX, etc. As a specific example for autonomous driving implementations, one of the guest OSes may control an In-Vehicle Infotainment (IVI) system, another a vehicle cluster, another a Heads-Up-Display (HUD) system, and yet another an ADAS and/or autonomous driving system. Any number of communications used to implement this functionality may be provided over the interface provided by the host controller 106.

In various examples, each of the VMs 108, 110, 114, and 116 may have a command ring to which the VM may provide any number of commands. Each VM may provide the commands in the VM's memory (e.g., address space) in the memory 118. For example, the VM 108 may provide a command to the VM memory 120 that is assigned to the VM 108. An example of such a command includes a request command, which a VM may use to request information regarding a connection and/or device capabilities (e.g., of the external device 130) in order to establish and/or modify a connection to another device, such as the external device 130 or another VM or logical device or component. The VMM 104 and/or the hypervisor may use the request command to modify and/or establish the connection. As an example, if the external device 130 is a digital camera, a request command may indicate what formats or transfers the digital camera supports.

The request command may be in different formats and/or may contain different types of information depending on the controller interface implemented by the host controller 106 and/or other connection criteria. For example, where the controller interface is based on xHCI, the command may include TRB data. The TRB data may be in the form of a data structure constructed in the memory and be representative of such information as a TRB type field, one or more reserved fields, and a Slot ID. Each VF (and VM) may be assigned a slot using a slot ID. The slot may have a slot context address including a slot context data structure containing information that relates to a device as a whole or affects all endpoints of a device. The VMM 104 may read this slot context address and program in PFs in a slot context.

For enhanced security, the VMM 104 and/or the hypervisor may not have the capability to directly read the VM's memory for command ring handling. For example, if the virtualization software becomes compromised, the VMM 104 could be able to read from an arbitrary location in the memory 118 and/or within a particular VM's memory. Instead, to read a request command from a VM, the interface manager 136 of the VMM 104 may provide a read command to the host controller 106 and the interface manager 146 of the host controller 106 may receive the read command, and in response use one or more controller direct memory accesses (DMAs) to read the data from the VM memory. The interface manager 146 of the host controller 106 may further provide the VMM 104 with access to the data, such as by providing (e.g., writing) the data to the VMM memory 134, which can be read by the interface manager 136 of the VMM 104. The VMM 104 may then use the communications processor 138 to process the command and facilitate the connection. The VMM memory 134 is shown as within the VMM 104 but may be external to the VMM 104. Further the VMM memory 134 may be included in the memory 118 and/or in various other components of the host system 102. The VMM memory 134 may generally refer to memory locations that are accessible to the interface manager 136 of the VMM 104.

The VMM 104 may be configured to provide at least some virtualization services to each of the VMs 108, 110, 114, and 116. This may include the VMM 104 trapping the capabilities and operational register space of each of the VMs 108, 110, 114, and 116. In some embodiments, the VMM 104 is configured to perform root port level virtualization of the VMs 108, 110, 114, and 116, where all devices may be connected to one root port and may be assigned to one guest operating system therein. The VMM 104 may also manage the physical function and the command ring of each of the VMs 108, 110, 114, and 116. In some embodiments, the VMM 104 may get notified via the interface manager 136 whenever a VF is trying to access capabilities and operational register space of the host controller 106. PF command and event rings of the VMM 104 may be configured to process VF commands using the communications processor 138 and to receive event TRBs from the host controller 106 using the interface manager 136. The interface manager 136 of the VMM 104 may also receive pad interrupts for all ports associated with the host controller 106 which the interface manager 136 may then forward to a respective VM in the form of an Inter VM Communications (IVC) message.

The host controller firmware 106 may be a trusted entity of the host system 102 that is signed and authenticated when loaded by the host system 102 through the system's chain of trust. The host controller firmware 106 may support any of a variety of host controller interfaces, such as those used for Universal Serial Bus (USB), FireWire, Bluetooth, Ethernet, Peripheral Component Interconnect (PCI), Near-Field Communication (NFC), Vehicle-to-everything (V2X), Car2Car, Cellular, Wireless Fidelity (WiFi), or other types of communications.

The host controller firmware 106 may determine what to access in the memory 118, how to do it securely, and how the results are made available to other components of the host system 102. To this effect, the host controller 106 may use the validator 142 to validate the read commands from the VMM 104 and/or data read from the memory 118 in response to the read commands in order to regulate access to the data. To validate a read command from the VM, the validator 142 may confirm that the read command matches a doorbell event for a corresponding VM's command ring. For example, when the VM 108 writes a request command to the VM memory 120, it may provide a doorbell event that is received by the interface manager 146 of the host controller firmware 106. If such a doorbell event was not received from the VM 108, but the interface manager 146 of the host controller firmware 106 has received a read command that requests that the host controller firmware 106 read from the VM memory 120, the validator 142 may determine that the read command is invalid.

As another example, the validator 142 may confirm that the interface manager 146 of the host controller 106 sent a doorbell event to the VMM 104 prior to receiving the read command. For example, in some embodiments, in response to receiving the doorbell event from the VM 108, the interface manager 146 of the host controller firmware 106 may provide a corresponding doorbell event to the VMM 104. The doorbell event to the VMM 104 may indicate to the VMM 104 to use the memory mapper 140 to determine a memory address for the VM 108 and provide the memory address or other indicator of one or more memory locations in the read command to the host controller 106. If such a doorbell event was not provided by the interface manager 146 of the host controller 106 to the VMM 104, but a read command is received that requests that the host controller firmware 106 read from the VM memory 120, the validator 142 may determine that the read command is invalid.

In any example, the validator 142 of the host controller 106 may use information in the read command to determine whether the read command is valid. For example, the read command may comprise one or more of a slot ID, a VF ID, a memory address to read from, or a memory size to read. In some examples, the validator 142 of the host controller 106 may determine that a read command is invalid if the VF ID does not match the ID of a VF provided to the host controller firmware 106 by the VM 108 in the doorbell event. Also in some examples, the validator 142 of the host controller 106 may determine that a read command is invalid if the slot ID does not match the ID of a slot provided to the host controller firmware 106 by the VM 108 in the doorbell event.

As another example, the validator 142 of the host controller 106 may validate the read command based on the memory size specified by the read command. This may include determining that the memory size is within a predetermined range and/or is of a predetermined size (which may vary based on other factors). For example, a TRB may be 16 bytes and a larger or smaller size may indicate an invalid command. Thus, if the validator 142 determines the memory size is not equal to 16 bytes, the validator 142 may determine the read command is invalid. If the read command is not validated by the validator 142, the host controller firmware 106 may refrain from using the interface manager 146 to read the memory locations indicated by the read command and/or from providing the VMM 104 with access to data read from the memory locations.

In addition to or instead of the validator 142 of the host controller 106 validating the read command, the validator 142 may validate the data read from the memory locations indicated by a read command. For example, the validator 142 may read the data and confirm the data is of a proper format and/or includes proper information or parameters. This may include the validator 142 checking that a request type field has a valid value, one or more reserved fields has an expected value, a Slot ID is within a predetermined range, and/or the data is in a predefined format. The expected value and/or the predetermined range may have static values or may be dynamically generated. Further, either may be predetermined or defined by the host controller firmware 106 such as coded to the host controller firmware 106. For example, any of the values may be hard-coded or computed by code at run-time and/or predetermined by the host controller firmware 106. In the example of an xHCI interface, this may include checking that a TRB type field is within a valid range, one or more reserved fields are equal to zero, the Slot ID is within a predetermined range, and/or the data is in a TRB format. If the validator 142 does not validate the data (e.g., determines the data is invalid), the interface manager 146 of the host controller firmware 106 may refrain from providing the VMM 104 with access to data read from the memory locations.

Figure 2:
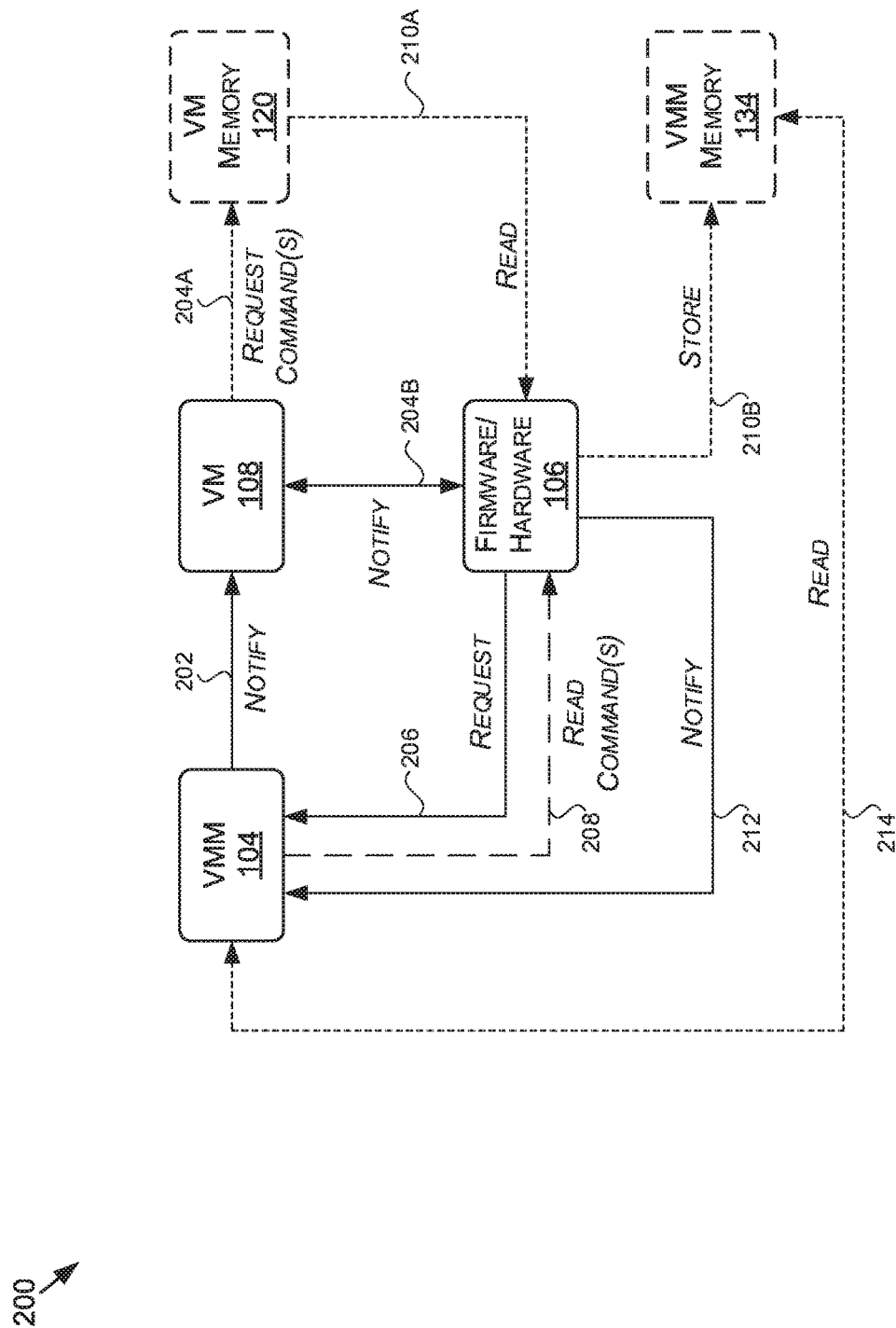
FIG. 2 is a flow diagram of an example of a process for validating access by virtualization software to data in memory, in accordance with some embodiments of the present disclosure.

Referring now to FIG. 2, FIG. 2 depicts a flow diagram of an example of a process 200 for validating access by virtualization software to data in memory, in accordance with some embodiments of the present disclosure. The example process 200 is illustrated using the VM 108 and the VM memory 120 of FIG. 1, by way of example. However, the process 200 may similarly be formed for the VMs and VM memory, such as the VMs 110, 114, or VM 116 of FIG. 1 and the VM memories 122, 124, or 126. The specific arrangement and make up of components from FIG. 1 are not intended to be limited by FIG. 2, and may vary in some embodiments. Although the process 200 is depicted with blocks and arrows, this is not intended to limit all embodiments of the process 200 to a particular order, or to particular operations.

At 202 of the process 200, the interface manager 136 of the VMM 104 may send a notification to the VM 108 of a connection related event. The notification may, for example, indicate to the VM 108 that a logical or physical device/entity (e.g., the external device 130) has connected to a port (e.g., a root port) and/or the device/entity is requesting a new or modified connection to the VM 108. For example, prior to the process 200, the VMM 104 may optionally detect the connection related event over a VF (e.g., based on a request from the entity and/or peripheral device). In some embodiments, this may include the interface manager 136 of the VMM 104 receiving a pad interrupt for the port associated with the VM 108. The interface manager 136 of the VMM 104 may then forward the notification comprising corresponding information (e.g., interrupt information) to the VM 108 at 202 in the form of an Inter VM Communications (IVC) message.

Based on receiving the notification at 202, the VM 108 may, at 204A, the VM 108 write a request command to the VM memory 120. For example, the VM 108 may write the request command to the command ring of the VM 108. The request command may be based on the notification and may include, for example, a request for connection and/or device properties (e.g., for the connected device). While a request command is described the request command may correspond to any number of commands (e.g., multiple request commands).

Also based on receiving the notification at 202, the VM 108 may, at 204B, notify the host controller firmware 106 about the command stored at 204A. For example, after, during, or prior to 204A, the VM 108 may send a doorbell event to the host controller firmware 106 to ring the doorbell of the host controller firmware 106. The interface manager 146 of the host controller firmware 106 may receive the notification and at 206 may send a request to the VMM 104 based on receiving the notification at 204B. In some examples, this includes forwarding the doorbell event to the VMM 104. In some examples, the communications processor 144 records information regarding the notification from the VM 108, which the validator 142 may use to validate read requests received from the VMM 104. This may include, for example, a number of notifications received from the VM 108 and/or any VM, a number of requests sent to the VMM 104 based on notifications received from the VM 108 and/or any VM, and/or a VM ID (e.g., VF ID) of the VM 108.

The request (e.g., a forwarded doorbell event) may be received by the interface manager 136 of the VMM 104 and indicate to the VMM 104 to help process the request command(s) in the VM memory 120 (e.g., to help process one or more commands in the command ring of the VM 108). The communications processor 144 of the VMM 104 may process the request from 206 and use the memory mapper 140 to map the request to one or more memory locations. The communications processor 144 may use the one or more memory locations to generate a read command and the interface manager 136 of the VMM 104 may provide the read command to the host controller 106 at 208. As discussed herein, the read command may indicate the one or more memory locations for the host controller firmware 106 to read, such as using a memory address in the memory 118 and a memory size for the read. The read command may also include a slot ID or VF ID of the VM 108.

The interface manager 146 of the host controller firmware 106 may receive the read command(s) from the VMM 104 and the communications processor 144 may use information in the read command(s) to read the request command(s) (e.g., command TRB data) at 210A that were stored to the VM memory 120 by the VM 108 at 204A. For example, the communications processor 144 may use the slot ID or VF ID to determine the unique stream ID for the VM 108. The interface manager 146 of the host controller firmware 106 may use the stream ID, the memory address, and the memory size to read from the VM memory 120. In the host system 102, stream IDs may be separately programmed in another hardware register by the hypervisor and used for memory access security with different stream IDs being assigned to different VFs/VMs.

Prior to, during, and/or after 210A, the communications processor 144 may use the validator 142 to validate one or more of the read command(s) from 208 and/or the data read at 210A. For example, in some embodiments, if the validator 142 determines the read command is invalid, 210A may not be performed. In other examples, the validator 142 may still read the data at 210A even if the read command is found to be invalid. Also, the validator 142 may or may not analyze the data to determine if the data is valid. In some examples, the validator 142 will always read the data without validation, if possible, then perform the validation on the data.

After the data is read at 210A, the interface manager 146 of the host controller firmware 106 may provide the data and/or information represented by the data to the VMM 104. In the example shown, the interface manager 146 may do so by storing the information (e.g., the command TRB data) in the VMM memory 134 at 210B. Also, at 212, the interface manager 146 of the host controller firmware 106 may provide a notification(s) to the VMM 104. The notification(s) may indicate to the VMM 104 that the information from 210B is in the VMM memory 134, the read command(s) from 208 were found valid by the validator 142, and/or the data read at 210A was found valid by the validator 142. The notification may be referred to, for example, as a command completion event. In some embodiments, the command completion event may include a CCode=1 indicating a success in validating the data and/or the read command. Had the data and/or the read command not been found valid by the validator 142, the command completion event (e.g., CCode) may indicate that one or more of the data and/or the read command were found to be invalid. For example, the command completion event may include a CCode=0, indicating a failure in validating the data and/or the read command. Further, the information may not have been stored to the VMM memory 134 at 210B were one or more of the data and/or the read command were found to be invalid.

The interface manager 136 of the VMM 104 may receive the notification from 212 from the host controller firmware 106 and based on the notification, read the information from the VMM memory 134. For example, the communications processor 144 may determine that the read command from 208 succeeded (e.g., by identifying CCode=1 in the command completion event) and based on the determination, read the information at 214. Had the read command failed, the VMM 104 may not attempt to read the information, and may optionally perform some other action. For example, the VMM 104 may notify the VM 108 regarding the failure. Where the VMM 104 successfully receives the information regarding the request command from the VM 108 at 214, the communications processor 138 may process the information and send the results (e.g., the requested information) to the VM 108 (e.g. in a command completion event TRB). Subsequently, the connection to the device/entity may be established and/or modified based on the results.

Figure 3:
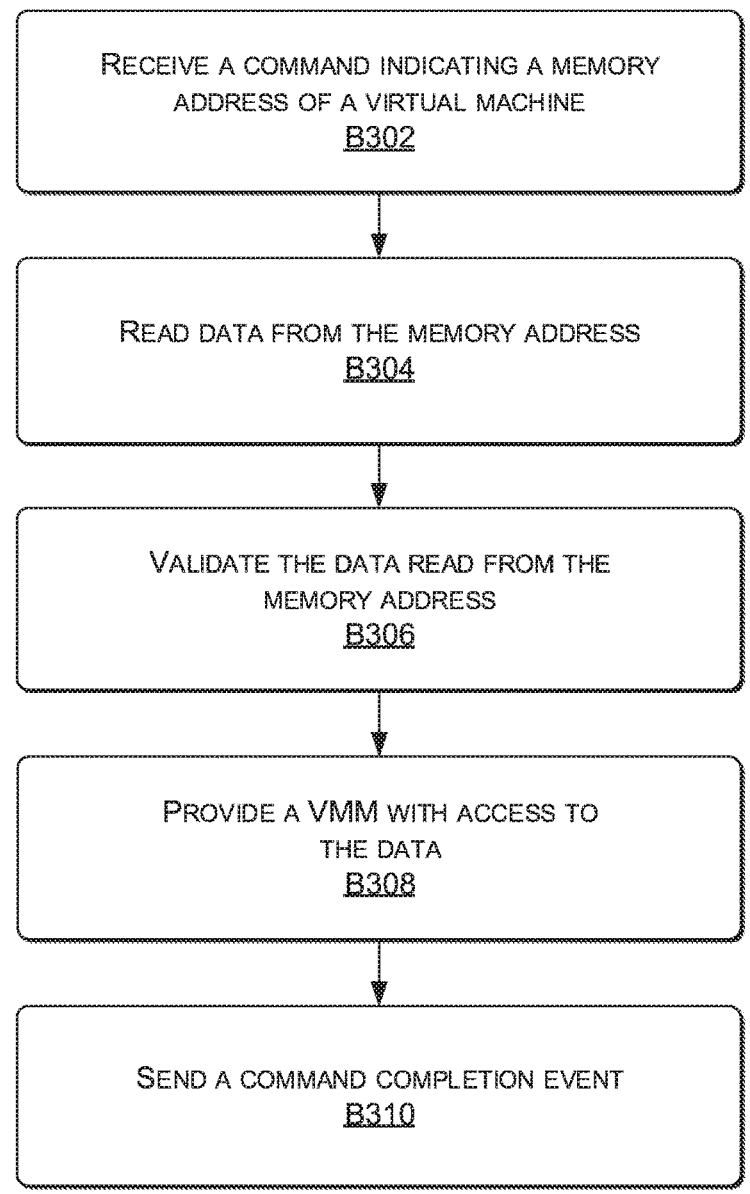
FIG. 3 is a flow diagram of an example of a method for validating data read from VM memory in response to a read command from virtualization software, in accordance with some embodiments of the present disclosure.
Figure 4:
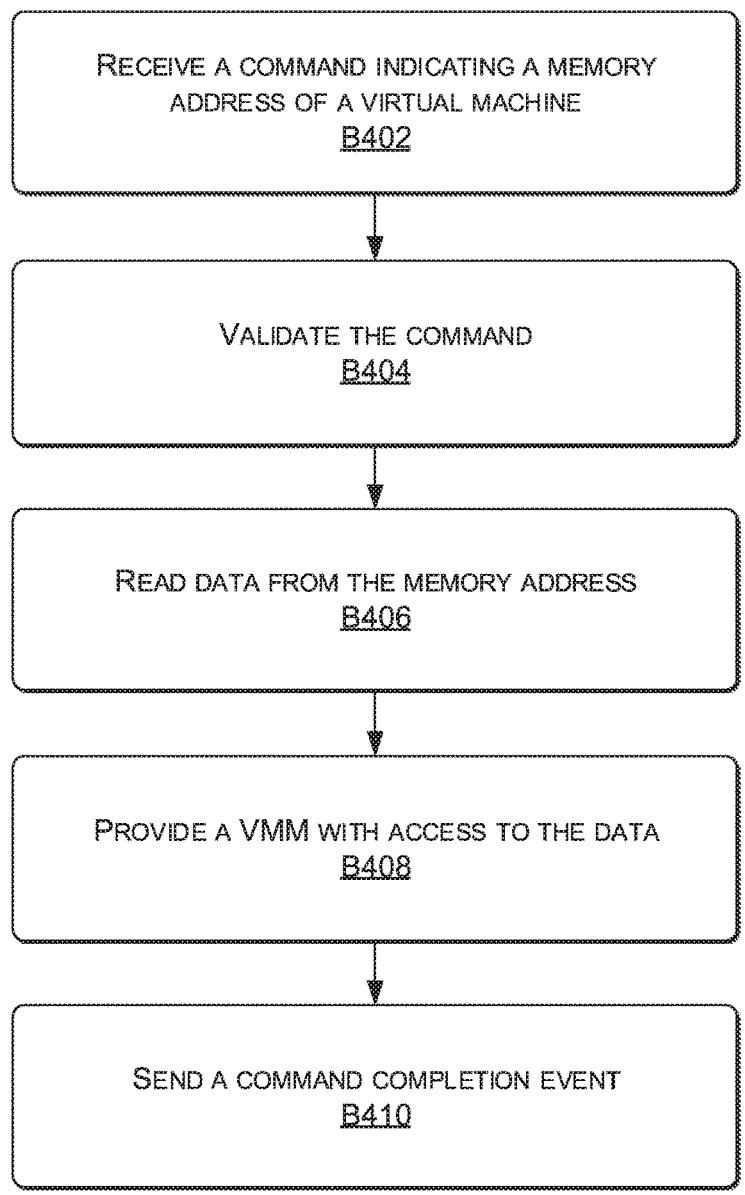
FIG. 4 is a flow diagram of an example of a method for validating a command from virtualization software to read VM memory, in accordance with some embodiments of the present disclosure.
Figure 5:
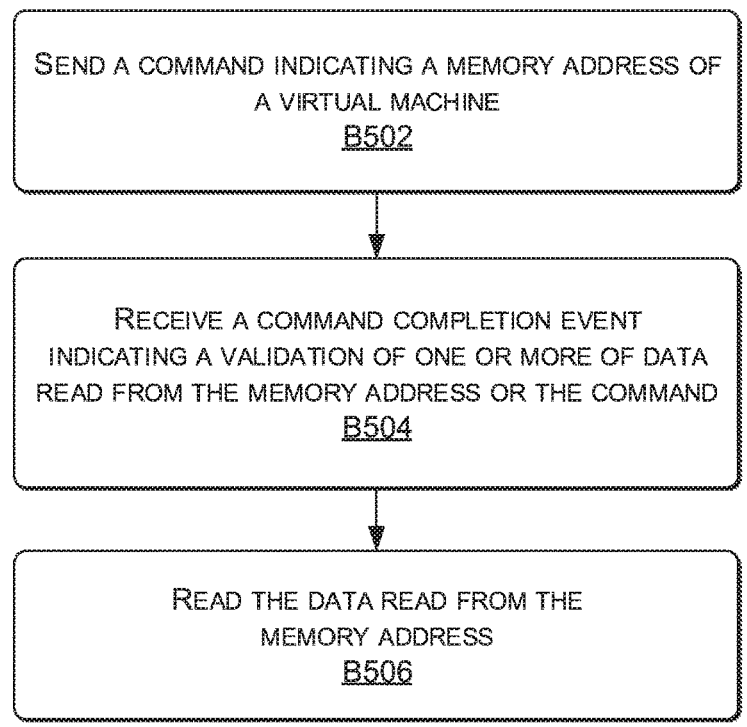
FIG. 5 is a flow diagram of an example of a method for virtualization software to read data from VM memory using a host controller firmware, in accordance with some embodiments of the present disclosure.

Now referring to FIGS. 3-5, each block of methods 300, 400, and 500, described herein, comprises a computing process that may be performed using any combination of hardware, firmware, and/or software. For instance, various functions may be carried out by a processor executing instructions stored in memory. The methods 300, 400, and 500 may also be embodied as computer-usable instructions stored on computer storage media. The methods 300, 400, and 500 may be provided by a standalone application, a service or hosted service (standalone or in combination with another hosted service), or a plug-in to another product, to name a few non-limiting examples. In addition, methods 300, 400, and 500 are described, by way of example, with respect to the host system 102 of FIG. 1. However, these methods 300, 400, and 500 may additionally or alternatively be executed by any one system, or any combination of systems, including, but not limited to, those described herein. Further, the methods 300, 400, or 500 may or may not correspond to the process 200 of FIG. 2.

Referring now to FIG. 3, FIG. 3 depicts a flow diagram of an example of a method for validating data read from VM memory in response to a read command from virtualization software, in accordance with some embodiments of the present disclosure. The method 300, at block B302, includes receiving a command indicating a memory address of a virtual machine. For example, the interface manager 146 of the host controller firmware 106 of FIG. 1 may receive a command (e.g., a read command) from the VMM 104. The command may indicate a memory address of the VM 108.

The method 300, at block B304, includes reading data from the memory address. For example, the interface manager 146 of the host controller firmware 106 may read data from the memory address in the VM memory 120 based on the receiving of the command.

The method 300, at block B306, includes validating the data read from the memory address. For example, the validator 142 of the host controller firmware 106 may validate the data read from the memory address.

The method 300, at block B308, includes providing a VMM with access to the data read. For example, the interface manager 146 of the host controller firmware 106 may provide the VMM 104 with access to the data read from the memory address based on the validation (e.g., via the VMM memory 134).

The method 300, at block B310, includes sending a command completion event. For example, the interface manager 146 of the host controller firmware 106 may send a command completion event to the VMM 104 indicating the data read from the memory address is validated.

Had the data not be validated at block B306, at least block B308 may not be performed. Also, in some embodiments, had the data not be validated at block B306, the command completion event at block B310 may indicate the data was not validated (e.g., found to be invalid).

Referring to FIG. 4, FIG. 4 depicts is a flow diagram of an example of a method 400 for validating a command from virtualization software to read VM memory, in accordance with some embodiments of the present disclosure. In some examples, the method 400 may be incorporated into the method 300. In other examples, the method 400 and the method 300 may be independent from one another.

The method 400, at block B402, includes receiving a command indicating a memory address of a virtual machine. For example, the interface manager 146 of the host controller firmware 106 of FIG. 1 may receive a command (e.g., a read command) from the VMM 104. The command may indicate a memory address of the VM 108.

The method 400 at block B404 may include validating the command. For example, the communications processor 144 may use the validator 142 to validate the command received from the VMM 104.

The method 400 at block B406 includes reading data from the memory address. For example, the interface manager 146 of the host controller firmware 106 may read data from the memory address in the VM memory 120 based on the receiving of the command. In some embodiments, the reading of the data from the memory address may be based on the validator 142 validating the command. In other examples, the data may be read regardless of whether the command is determined to be valid.

The method 400, at block B408, includes providing a VMM with access to the data read. For example, the interface manager 146 of the host controller firmware 106 may provide the VMM 104 with access to the data read from the memory address based on the validation (e.g., via the VMM memory 134).

The method 400, at block B410, includes sending a command completion event. For example, the interface manager 146 of the host controller firmware 106 may send a command completion event to the VMM 104 indicating the data read from the memory address is validated.

Had the command not been validated at block B404, at least block B408 may not be performed. Also, in some embodiments, had the data not been validated at block B404, the command completion event at block B410 may indicate the command was not validated (e.g., found to be invalid) and/or block B406 may not be performed. Further in some cases, block B406 may be performed prior to block B404.

Referring to FIG. 5, FIG. 5 depicts is a flow diagram of an example of a method 500 for virtualization software to read data from VM memory using a host controller firmware, in accordance with some embodiments of the present disclosure. In some examples, the method 500 may be incorporated into one or more of the method 300 or the method 400. For example, the method 500 may correspond to the method 300 and/or the method 400 from a perspective of a VMM. In other examples, the method 500 and the method 300 or the method 400 may be independent from one another.

The method 500, at block B502, includes sending a command indicating a memory address of a virtual machine. For example, the interface manager 136 of the VMM 104 of FIG. 1 may send a command (e.g., a read command) to the host controller firmware 106. The command may indicate a memory address of the VM 108. In some embodiments, block B502 may be based on the interface manager 136 of the VMM 104 receiving a doorbell event from the host controller 106, as described herein.

The method 500, at block B504, includes receiving a command completion event indicating a validation of the data read from the memory address, the command, or both. For example, the interface manager 136 of the VMM 104 may receive a command completion event from the host controller firmware 106. The command completion event may indicate (e.g., via a CCode as described herein) a validation, by the host controller firmware 106, of the command, the data read from the memory address based on the command, or both.

The method 500, at block B506, includes reading the data read from the memory address. For example, interface manager 136 of the VMM 104 may read the data read from the memory address.

Figure 6:
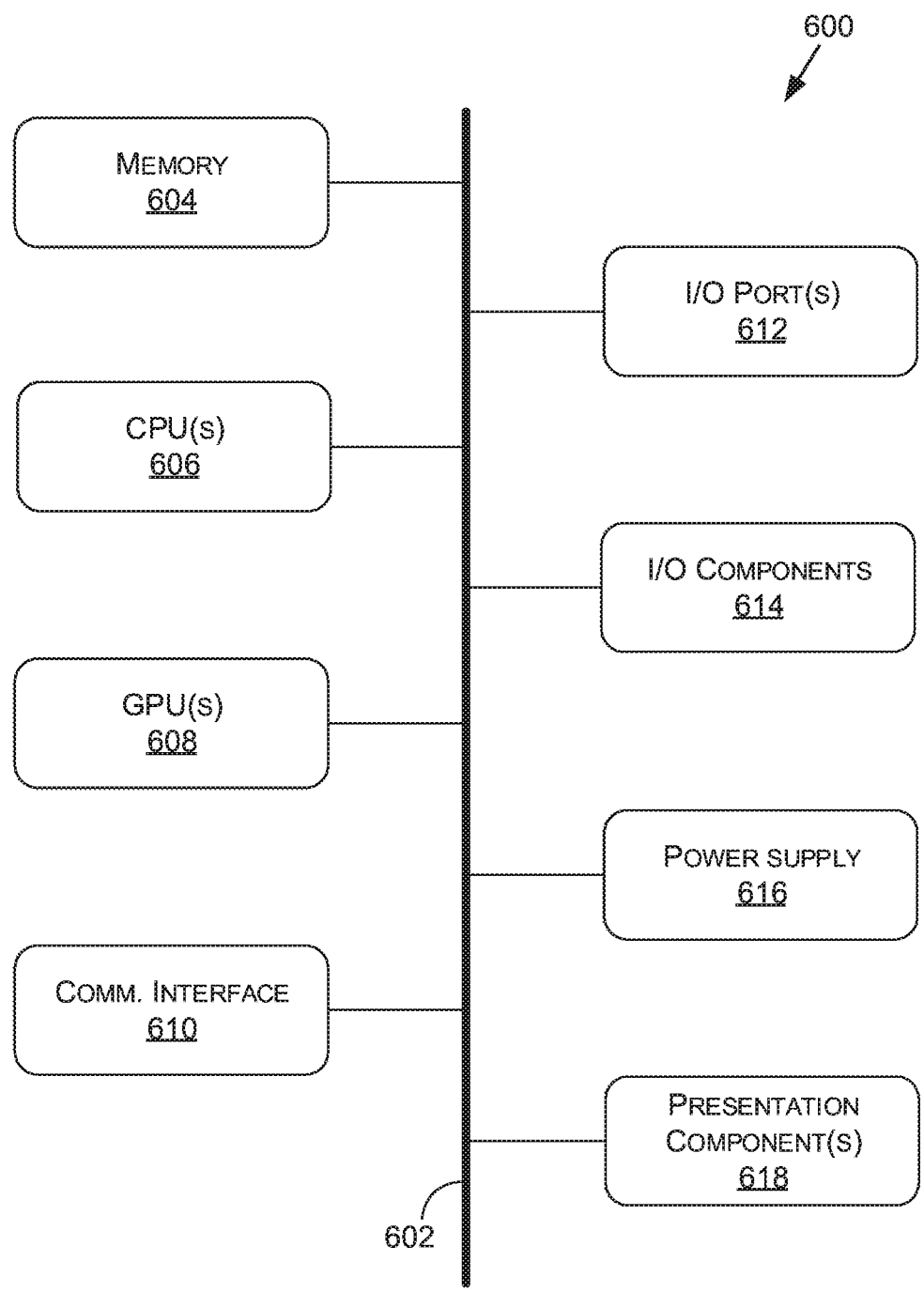
FIG. 6 is a block diagram of an example computing environment suitable for validating access by virtualization software to data in memory, in accordance with some embodiments of the present disclosure.

FIG. 6 is a block diagram of an example computing environment suitable for validating access by virtualization software to data in memory in some implementations of the present application. Computing device 600 may include a bus 602 that directly or indirectly couples the following devices: memory 604, one or more central processing units (CPU) 606, one or more graphics processing units (GPU) 608, a communication interface 610, input/output (I/O) ports 612, input/output components 614, a power supply 616, and one or more presentation components 618 (e.g., display(s)).

Although the various blocks of FIG. 6 are shown as connected via the bus 602 with lines, this is not intended to be limiting and is for clarity only. For example, in some embodiments, a presentation components 618, such as a display device, may be considered an I/O component 614 (e.g., if the display is a touch screen). As another example, the CPU(s) 606 and/or GPU(s) 608 may include memory (e.g., the memory 604 may be representative of a storage device in addition to the memory of the GPU(s) 608, the CPU(s) 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The bus 602 may represent one or more busses, such as an address bus, a data bus, a control bus, or a combination thereof. The bus 602 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program applications, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The communication media may embody computer-readable instructions, data structures, program applications, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 606 may be configured to execute the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an ARM processor implemented using Reduced Instruction Set Computing (RISC) or an x86 processor implemented using Complex Instruction Set Computing (CISC). The computing device 600 may include one or more CPU(s) 606 in addition to one or more microprocessors or supplementary co-processors, such as math co-processors.

The GPU(s) 608 may be used by the computing device 600 to render graphics (e.g., 3D graphics). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data. The display memory may be included as part of the memory 604. The GPU(s) 608 may include two or more GPU(s) operating in parallel (e.g., via a link). When combined together, each GPU 608 may generate pixel data for different portions of an output image or for different output images (e.g., a first GPU for a first image and a second GPU for a second image). Each GPU may include its own memory, or may share memory with other GPUs.

In examples where the computing device 600 does not include the GPU(s) 608, the CPU(s) 606 may be used to render graphics and/or process data.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. A NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

The disclosure may be described in the general context of computer code or machine-useable instructions, including computer-executable instructions such as program applications, being executed by a computer or other machine, such as a personal data assistant or other handheld device. Generally, program applications including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
receiving, by a host controller firmware, a notification from a virtual machine (VM) in association with data stored in a memory comprised in a computing device and allocated to the VM, the notification defining one or more values;
receiving a command from a virtual machine manager (VMM), the command indicating a memory address corresponding to the data in the memory;
reading the data from the memory address based on the receiving of the command;
validating, by the host controller firmware, the data read from the memory address based at least on determining the data read from the memory represents content that includes the one or more values defined by the notification;
providing, by the host controller firmware, the VMM with access to the data read from the memory address based on the content including the one or more values; and
sending a command completion event to the VMM indicating the data read from the memory address is validated.

2. The method of claim 1, wherein the validating of the data comprises determining that one or more reserved fields represented by the data has an expected value of the one or more values that is defined by code of the host controller firmware, the host controller firmware identifying the expected value from content of the notification.

3. The method of claim 1, wherein the validating of the data comprises determining a Slot ID represented by the data is within a predetermined range including the one or more values that is defined by code of the host controller firmware, the host controller firmware identifying the predetermined range from content of the notification.

4. The method of claim 1, wherein the command is a read command generated by the VMM and comprises the memory address and a data size to be read using the memory address, and the validating includes determining the memory size matches an expected size of the content based at least on the expected size being indicated by the notification.

5. The method of claim 1, wherein the validating of the data comprises:
identifying a request type represented by the data; and
determining that the request type is in a valid group of request types.

6. The method of claim 1, wherein the receiving of the command from the VMM is based on detecting a connection of an entity to a host controller, the data comprises a request by the VM for connection capabilities of the entity, and the notification represents a doorbell event for the request.

7. A method comprising:
receiving, by a host controller firmware, a notification from a virtual machine (VM) in association with data stored in a memory comprised in a computing device and allocated to the VM, the notification indicating one or more characteristics of a data structure represented by the data;
receiving a command from a virtual machine manager (VMM), the command indicating a memory address corresponding to the data in the memory;
reading the data from the memory address based on the receiving of the command;
validating, by the host controller firmware, the data read from the memory address based at least on determining the data structure read from the memory matches the one or more characteristics indicated by the notification;
providing, by the host controller firmware, the VMM with access to the data read from the memory address based on the data structure matching the one or more characteristics; and
sending a command completion event to the VMM indicating the command is validated.

8. The method of claim 7, wherein the providing the VMM with access to the data is further based on the validating of the data wherein the one or more characteristics include a memory size of the data structure.

9. The method of claim 7, wherein the validating includes confirming the host controller firmware sent a doorbell event to the VMM in response to receiving the notification and prior to receiving the command.

10. The method of claim 7, wherein the one or more characteristics include a predefined format of the data structure.

11. The method of claim 7, wherein the reading of the memory address is performed by the host controller firmware using direct memory accesses of virtual machine memory.

12. The method of claim 7, wherein the host controller firmware is of a host controller and the VMM uses the data read from the memory address to establish or modify a connection between the virtual machine and another entity over the host controller.

13. A system comprising:
a virtual machine manager (VMM) to:
send a command to a host controller firmware, the command indicating a memory address in a memory comprised in a computing device and allocated to a virtual machine (VM);
receive a command completion event indicating a validation, by the host controller firmware, of the command; and
process data read from the memory address based on content represented by the data matching one or more characteristics; and
a host controller hardware including the host controller firmware to:
receive a notification from the VM in association with the data stored in the memory, the notification defining the one or more characteristics of the content represented by the data;
receive the command from the VMM;
perform the validation to confirm the content matches the one or more characteristics defined by the notification; and
send the command completion event to the VMM.

14. The system of claim 13, wherein the notification includes a doorbell event and the VMM is further to receive the doorbell event forwarded from the host controller firmware, wherein the sending of the command is based on the doorbell event.

15. The system of claim 13, wherein the command comprises the memory address and a data size to be read by the host controller firmware using the memory address, the one or more values representing the data size.

16. The system of claim 13, wherein the validation determines that one or more reserved fields represented by the data has an expected value of the one or more values that is defined by code of the host controller firmware.

17. The system of claim 13, wherein the validation determines a Slot ID represented by the data is within a predetermined range that is defined by code of the host controller firmware, the one or more values represent the predetermined range.

18. The system of claim 13, wherein the VMM is further configured to:
send an additional command to the host controller firmware, the additional command indicating a virtual machine memory address;
receive an additional command completion event indicating a failure, by the host controller firmware, to validate one or more of data read from the virtual machine memory address or the additional command.

19. The system of claim 13, wherein the system is comprised in an autonomous vehicle.

20. The system of claim 13, wherein the one or more values include a VM ID the VM received in the notification and the validation is based at least on determining the command includes the VM ID.

* * * * *